(12) United States Patent
Lavoie et al.

(10) Patent No.: US 9,829,883 B1
(45) Date of Patent: Nov. 28, 2017

(54) TRAILER BACKUP ASSIST SYSTEM HAVING REMOTE CONTROL AND USER SIGHT MANAGEMENT

(71) Applicant: Ford Global Technologies, LLC, Dearborn, MI (US)

(72) Inventors: Erick Michael Lavoie, Dearborn, MI (US); Zheng Hu, Farmington Hills, MI (US); Donald Jacob Mattern, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/295,019

(22) Filed: Oct. 17, 2016

(51) Int. Cl.
| | |
|---|---|
| *B62D 13/06* | (2006.01) |
| *G05D 1/00* | (2006.01) |
| *G05D 1/02* | (2006.01) |
| *B60C 9/00* | (2006.01) |
| *B62D 13/00* | (2006.01) |
| *H04M 1/725* | (2006.01) |

(52) U.S. Cl.
CPC ............ *G05D 1/0016* (2013.01); *B60C 9/00* (2013.01); *B62D 13/00* (2013.01); *G05D 1/0022* (2013.01); *G05D 1/0223* (2013.01); *G05D 1/0033* (2013.01); *G05D 1/0236* (2013.01); *G05D 1/0242* (2013.01); *G05D 1/0255* (2013.01); *G05D 1/0257* (2013.01); *G05D 2201/0213* (2013.01); *H04M 1/72527* (2013.01)

(58) Field of Classification Search
CPC ...... G05D 1/0016; G08G 1/168; B60R 1/002; B60R 1/025; B62D 13/06; B62D 1/36; B60Q 1/302; G02B 27/01
See application file for complete search history.

(56) References Cited

U.S. PATENT DOCUMENTS

| | | | | |
|---|---|---|---|---|
| 3,868,176 | A | * | 2/1975 | Young .................... B60R 1/025 359/841 |
| 4,600,913 | A | * | 7/1986 | Caine .................... B60Q 1/302 340/435 |
| 5,035,441 | A | * | 7/1991 | Murray .................... B60D 1/36 116/28 R |

(Continued)

FOREIGN PATENT DOCUMENTS

| | | |
|---|---|---|
| EP | 0842841 B1 | 5/2002 |
| EP | 1006042 B1 | 4/2006 |

(Continued)

OTHER PUBLICATIONS

Sh.Azadi et al., Automatic Parking of an Articulated Vehicle Using ANFIS, Global Journal of Science, Engineering and Technology, GJSET Publishing, 2013, Issue 14, 2013, pp. 93-104.

(Continued)

*Primary Examiner* — Yuri Kan

(74) *Attorney, Agent, or Firm* — Raymond Coppiellie; Price Heneveld LLP

(57) ABSTRACT

A system for backing a trailer with a vehicle is provided herein and includes a mobile electronic device with which a user inputs an intended backing path for the trailer. A controller autonomously controls the vehicle to back the trailer according to the intended backing path. The controller communicates with a sensing system to determine if the user has lost sight of at least one of the vehicle and the trailer.

20 Claims, 4 Drawing Sheets

(56) References Cited

U.S. PATENT DOCUMENTS

| | | |
|---|---|---|
| 5,919,241 A | 7/1999 | Bolourchi et al. |
| 6,122,579 A | 6/2000 | Collier-Hallman et al. |
| 6,370,459 B1 | 4/2002 | Phillips |
| 6,424,895 B1 | 7/2002 | Shimizu et al. |
| 6,631,781 B2 | 10/2003 | Williams et al. |
| 7,039,504 B2 | 5/2006 | Tanaka et al. |
| 7,225,891 B2 | 6/2007 | Gehring et al. |
| 7,546,191 B2 | 6/2009 | Lin et al. |
| 7,706,944 B2 | 4/2010 | Tanaka et al. |
| 7,777,615 B2 | 8/2010 | Okuda et al. |
| 8,020,657 B2 | 9/2011 | Allard et al. |
| 8,139,109 B2 | 3/2012 | Schmiedel et al. |
| 8,169,341 B2 | 5/2012 | Toledo et al. |
| 8,290,657 B2 | 10/2012 | Lavoie |
| 8,374,749 B2 | 2/2013 | Tanaka |
| 8,406,956 B2 | 3/2013 | Wey et al. |
| 8,464,829 B2 | 6/2013 | Von Tardy-Tuch et al. |
| 8,498,770 B2 | 7/2013 | Takano |
| 8,521,364 B2 | 8/2013 | Hueger et al. |
| 8,571,758 B2 | 10/2013 | Klier et al. |
| 8,645,015 B2 | 2/2014 | Oetiker et al. |
| 8,823,796 B2 | 9/2014 | Shen et al. |
| 8,825,221 B2 | 9/2014 | Hueger et al. |
| 8,948,990 B2 | 2/2015 | Kobayashi et al. |
| 8,957,786 B2 | 2/2015 | Stempnik et al. |
| 9,102,271 B2 | 8/2015 | Trombley et al. |
| 9,132,856 B2 | 9/2015 | Shepard |
| 9,174,672 B2 | 11/2015 | Zeng et al. |
| 9,229,453 B1 | 1/2016 | Lee |
| 9,238,483 B2 | 1/2016 | Hafner et al. |
| 9,400,897 B2 | 7/2016 | Bruening et al. |
| 9,429,943 B2 | 8/2016 | Wilson et al. |
| 9,464,913 B2 | 10/2016 | Brown et al. |
| 9,520,063 B2 | 12/2016 | Noh |
| 2003/0128436 A1* | 7/2003 | Ishii .................. G02B 27/01 359/630 |
| 2006/0190147 A1 | 8/2006 | Lee et al. |
| 2007/0057816 A1 | 3/2007 | Sakakibara et al. |
| 2009/0222202 A1 | 9/2009 | Kato |
| 2012/0283909 A1 | 11/2012 | Dix |
| 2012/0316732 A1 | 12/2012 | Auer |
| 2013/0006472 A1* | 1/2013 | McClain ............. B62D 13/06 701/41 |
| 2013/0103246 A1 | 4/2013 | Staack |
| 2013/0120161 A1 | 5/2013 | Wakabayashi et al. |
| 2013/0158863 A1* | 6/2013 | Skvarce ............. G08G 1/168 701/428 |
| 2013/0229524 A1 | 9/2013 | Vovkushevsky et al. |
| 2013/0238193 A1 | 9/2013 | Bolourchi et al. |
| 2014/0085472 A1* | 3/2014 | Lu ........................ B60R 1/002 348/148 |
| 2014/0121883 A1 | 5/2014 | Shen et al. |
| 2014/0121930 A1 | 5/2014 | Allexi et al. |
| 2014/0188344 A1 | 7/2014 | Lavoie |
| 2015/0012202 A1 | 1/2015 | Moore et al. |
| 2015/0025732 A1 | 1/2015 | Min et al. |
| 2015/0077557 A1 | 3/2015 | Han et al. |
| 2015/0158524 A1 | 6/2015 | Lee et al. |
| 2015/0191200 A1 | 7/2015 | Tsubaki et al. |
| 2015/0251602 A1 | 9/2015 | Baur et al. |
| 2015/0274202 A1 | 10/2015 | Tsunoda et al. |
| 2015/0369613 A1 | 12/2015 | Stadler |
| 2016/0207526 A1 | 7/2016 | Franz et al. |
| 2016/0229452 A1 | 8/2016 | Lavoie et al. |
| 2016/0304088 A1 | 10/2016 | Barth |
| 2016/0304122 A1 | 10/2016 | Herzog et al. |
| 2016/0320477 A1 | 11/2016 | Heimberger |
| 2017/0008559 A1* | 1/2017 | Shepard ............. B62D 13/06 |

FOREIGN PATENT DOCUMENTS

| | | |
|---|---|---|
| EP | 2213546 A1 | 8/2010 |
| GB | 2496298 A | 5/2013 |
| JP | 649063 A | 1/1989 |
| JP | 2002337717 A | 11/2002 |
| JP | 2003261053 A | 9/2003 |
| JP | 2009113512 A | 5/2009 |
| KR | 20110114897 | 4/2010 |
| KR | 1020140004411 A | 1/2014 |
| KR | 1020150038776 A | 4/2015 |

OTHER PUBLICATIONS

Cuesta et al., Intelligent System for Parallel Parking of Cars and Tractor-Trailers, Intelligent Mobile Robot Navigation, STAR 16, Springer-Verlag Berlin Heidelberg 2006, pp. 159-188.

* cited by examiner

US 9,829,883 B1

TRAILER BACKUP ASSIST SYSTEM HAVING REMOTE CONTROL AND USER SIGHT MANAGEMENT

FIELD OF THE INVENTION

The present invention generally relates to trailer backup assist systems, and more particularly, to trailer backup assist systems allowing a user to assume remote control of a vehicle.

BACKGROUND OF THE INVENTION

Backing a vehicle while towing a trailer can be challenging for many drivers, particularly for drivers that drive with a trailer on an infrequent basis or with various types of trailers. Similarly challenging is backing a vehicle towards a stationary trailer in order to make a hitch connection therebetween. In the instances described above, the vehicle operator may lack vision of the surrounding environment in which the vehicle and trailer operate. Accordingly, there is a need for a system enabling a user to be located remotely from the vehicle whilst still enabling the user to influence the vehicle during backing maneuvers. In this manner, the user is provided greater vision of the vehicle, trailer, and surrounding environment.

SUMMARY OF THE INVENTION

According to one aspect of the present invention, a system for backing a trailer with a vehicle is provided and includes a mobile electronic device with which a user inputs an intended backing path for the trailer. A controller autonomously controls the vehicle to back the trailer according to the intended backing path. The controller communicates with a sensing system to determine if the user has lost sight of at least one of the vehicle and the trailer.

According to another aspect of the present invention, a system for hitching a vehicle to a trailer is provided and includes a mobile electronic device with which a user inputs an intended backing path of the vehicle towards the trailer. A controller autonomously controls the vehicle according to the intended backing path. The controller communicates with a sensing system to determine if the user or other object crosses into the intended backing path, and if so, generates a countermeasure.

According to yet another aspect of the present invention, a method of backing a trailer with a vehicle is provided and includes using a mobile electronic device to input an intended backing path for the trailer and providing a controller for autonomously controlling the vehicle to back the trailer according to the intended backing path, wherein the controller communicates with a sensing system to determine if the user has lost sight of at least one of the vehicle and the trailer.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
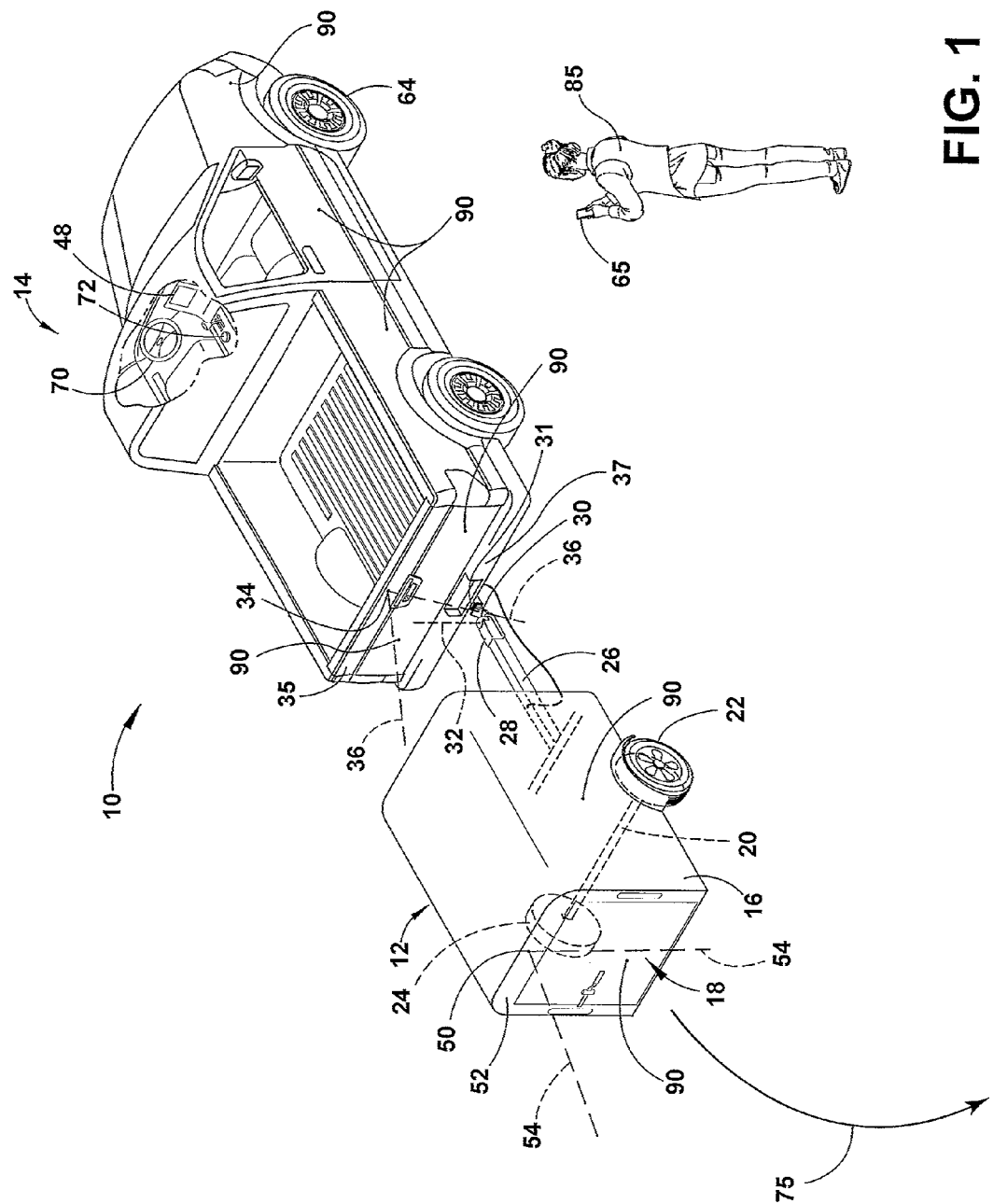
FIG. 1 is a top perspective view of a vehicle attached to a trailer with one embodiment of a system for backing a trailer with a vehicle.
Figure 2:
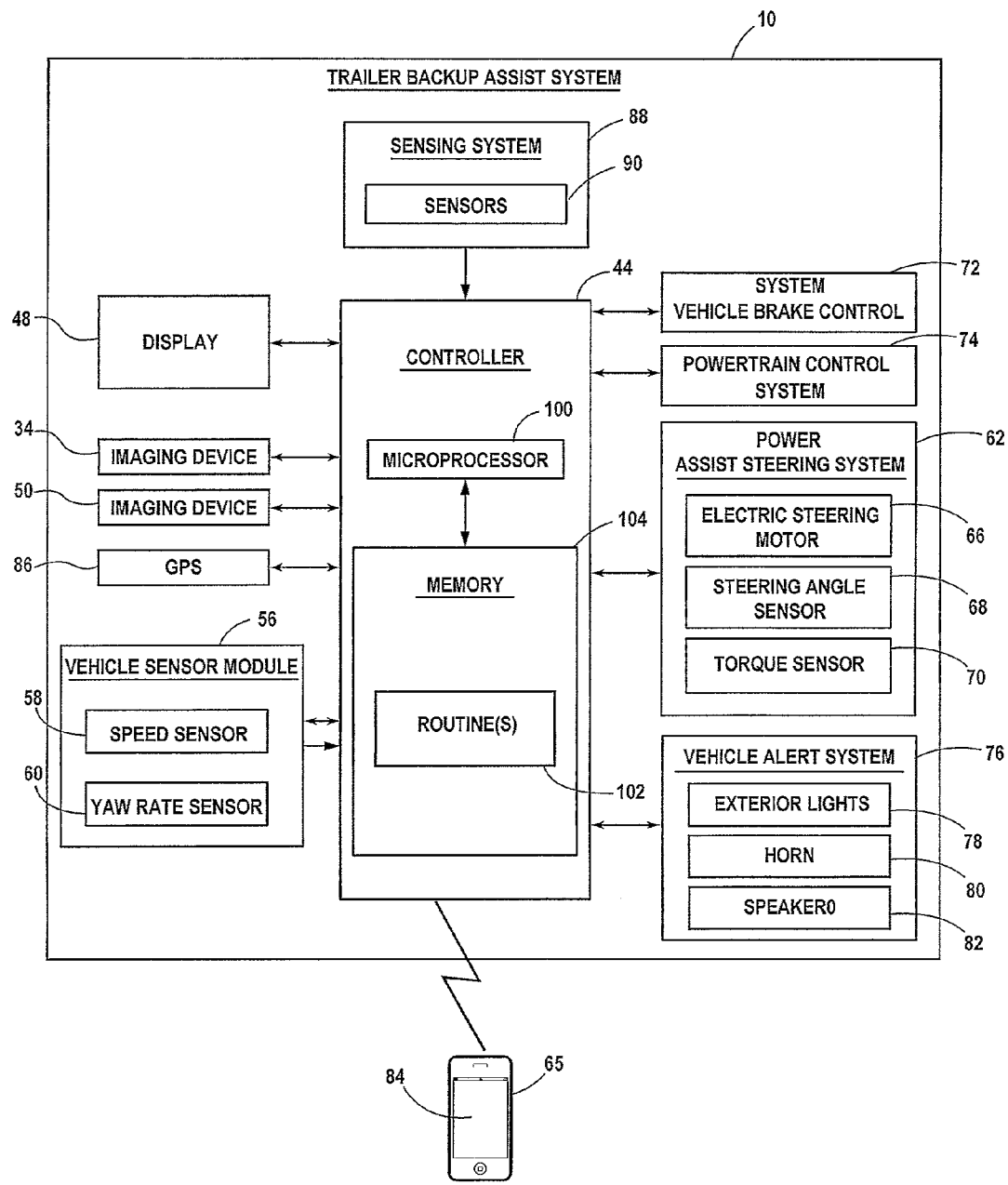
FIG. 2 is a block diagram illustrating the system of FIG. 1 in greater detail.

Referring to FIGS. 1 and 2, reference numeral 10 generally designates a system for backing a trailer 12 with a vehicle 14. The vehicle 14 is embodied as a pickup truck that is pivotally attached to one embodiment of the trailer 12 that has a box frame 16 with an enclosed cargo area 18, a single axle 20 operably coupled to wheels 22 and 24, and a tongue 26 longitudinally extending forward from the enclosed cargo area 18. The trailer 12 also has a trailer hitch connector in the form of a coupler assembly 28 that is connected to a vehicle hitch connector in the form of a hitch ball 30 and drawbar 31. The coupler assembly 28 latches onto the hitch ball 30 to provide a pivoting hitch point 32 that allows for articulation of a hitch angle between the vehicle 14 and the trailer 12. As defined herein, the hitch angle corresponds to the angle formed between the center longitudinal axis of the vehicle 14 and of the trailer 12. It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

The system 10 also includes an imaging device 34 located at the rear of the vehicle 14. The imaging device 34 may be centrally located at an upper region of a vehicle tailgate 35 such that the imaging device 34 is elevated relative to the tongue 26 of the trailer 12. The imaging device 34 has a field of view 36 located and oriented to capture one or more images of a rear-vehicle scene including the trailer 12 or portions thereof. Additionally, the captured images may include portions of the vehicle 14 such as a rear bumper 37. Images captured using imaging device 34 may be provided to a controller 44 of the system 10 for image processing. In some embodiments, the processed images may be used to determine the hitch angle between the vehicle 14 and the trailer 12. An example of a system employing image-based hitch angle detection is disclosed in U.S. patent application Ser. No. 15/220,750, entitled "TRAILER ANGLE DETECTION FOR TRAILER BACKUP ASSIST SYSTEM," filed on Jul. 27, 2016, which is incorporated herein by reference in its entirety. Additionally or alternatively, the processed images may be shown on a display 48 located in the cabin of the vehicle 14. In the depicted embodiment, the display 48 is a touchscreen center-stack navigation or entertainment display. In such an arrangement, the display 48 may also function as a user-input device with which an occupant may communicate with the controller 44. For example, the display 48 may show multimedia instructions for assisting users with setting up the trailer 12 or features of the system 10. Additionally, a user may enter information via the display 48 or other user-input device apparent to a skilled artisan. The information may include user preferences and trailer measurements, for example.

In some embodiments, an additional imaging device 50 may be located on a rear structure 52 of the trailer 12. The imaging device 50 may have a field of view 54 elevated relative to the ground and oriented to capture images of a rear-trailer scene. Imaging device 50 may be configured as a camera capable of being retrofitted or otherwise mounted to the trailer 12. For example, imaging device 50 may be a dedicated camera or a mobile electronic device having image capturing capabilities such as, but not limited to, a smartphone, tablet, and the like. Images captured using imaging device 50 may be transmitted wirelessly (e.g., over a WiFi® or Bluetooth® connection) to the controller 44 for image processing. The processed images may then be displayed on the display 48.

With respect to the depicted embodiment, the controller 44 of system 10 may be configured to communicate with a variety of vehicle equipment. The system 10 may include a vehicle sensor module 56 that monitors certain dynamics of the vehicle 14. The vehicle sensor module 56 may generate a plurality of signals that are communicated to the controller 44 and may include a vehicle speed signal generated by a speed sensor 58 and a vehicle yaw rate signal generated by a yaw rate sensor 60. In response, the controller 44 processes the information and may generate corresponding steering commands that are supplied to a power assist steering system 62 of the vehicle 14.

According to one embodiment, the controller 44 of the system 10 may control the power assist steering system 62 of the vehicle 14 to operate steered wheels 64 of the vehicle 14 for moving the vehicle 14 in such a manner that the trailer 12 reacts in accordance with an intended backing path of the trailer 12 inputted to the controller 44 via a mobile electronic device 65, as will be described in greater detail herein. The power assist steering system 62 may be an electric power-assisted steering (EPAS) system that includes an electric steering motor 66 for turning the steered wheels 64 to a steering angle based on a steering command generated by the controller 44, whereby the steering angle may be sensed by a steering angle sensor 68 of the power assist steering system 62 and provided to the controller 44. The steering command may be provided for autonomously steering the vehicle 14 during a backup maneuver and may alternatively be provided manually via a rotational position (e.g., a steering wheel angle) of a steering wheel 70 or a rotatable knob 72 configured pursuant to that disclosed in U.S. Pat. No. 9,464,886 to Salter et al., entitled "LUMINESCENT HITCH ANGLE DETECTION COMPONENT," issued on Oct. 11, 2016, which is incorporated herein by reference in its entirety.

In some embodiments, the steering wheel 70 of the vehicle 14 may be mechanically coupled with the steered wheels 64 of the vehicle 14, such that the steering wheel 70 moves in concert with steered wheels 64 via an internal torque, thereby preventing manual intervention with the steering wheel 70 during autonomous steering of the vehicle 14. In such instances, the power assist steering system 62 may include a torque sensor 70 that senses torque (e.g., gripping and/or turning) on the steering wheel 70 that is not expected from autonomous control of the steering wheel 70 and therefore indicative of manual intervention by the driver. In some embodiments, external torque applied to the steering wheel 70 may serve as a signal to the controller 44 that the driver has taken manual control and for the system 10 to discontinue autonomous steering functionality.

The controller 44 of the system 10 may also communicate with a vehicle brake control system 72 of the vehicle 14 to receive vehicle speed information such as individual wheel speeds of the vehicle 14. Additionally or alternatively, vehicle speed information may be provided to the controller 44 by a powertrain control system 74 and/or the speed sensor 58, among other conceivable means. It is conceivable that individual wheel speeds may be used to determine a vehicle yaw rate, which can be provided to the controller 44 in the alternative, or in addition to, the vehicle yaw rate measured by yaw rate sensor 60 of the vehicle sensor module 56. In some embodiments, the controller 44 may provide commands to the vehicle brake control system 72 and the powertrain control system 74, thereby allowing the system 10 to regulate the speed of the vehicle 14 during a backup maneuver of the trailer 12 along an intended backing path 75. While the intended backing path 75 is shown as being curved, it is to be understood that the intended backing path 75 may be straight or otherwise include curved and straight sections.

For purposes of disclosure, the power assist steering system 62, the vehicle brake control system 72, and the powertrain control system 74 are collectively referred to herein as "the driveline" of the vehicle 14. Through interaction with the driveline, the potential for unacceptable trailer backup conditions can be reduced. Examples of unacceptable trailer backup conditions include, but are not limited to, a vehicle over-speed condition, a high hitch angle rate, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the controller 44 of the system 10 can generate an alert signal corresponding to a notification of an actual, impending, and/or anticipated unacceptable trailer backup condition, and prior to driver intervention, generate a counter measure to prevent such an unacceptable trailer backup condition. For example, the controller 44 may communicate with one or more devices, including a vehicle alert system 76, which may prompt visual, auditory, and tactile warnings. The vehicle alert system 76 may include exterior lights 78 of the vehicle 14 for providing a visual alert and a vehicle horn 80 and/or speaker 82 for providing an audible alert.

In the depicted embodiment, the intended backing path 75 of the trailer 12 may be inputted to the controller 44 using the mobile electronic device 65. Communication between the mobile electronic device 65 and the controller 44 may occur wirelessly (e.g., over a WiFi® or Bluetooth® connection) or via a wired connection (e.g., over a USB connection). In some embodiments, the mobile electronic device 65 may be embodied as a smartphone, a tablet, or the like and includes an application stored thereon for enabling the mobile electronic device 65 to interface with the system 10. In smartphone embodiments, for example, the intended backing path 75 may be inputted via a touchscreen display 84 through one or more touch motions including pressing, swiping, dragging, and the like. In alternative embodiments, the intended backing path 75 may be inputted using buttons, sliders, knobs, joysticks, or other user-input mechanisms provided on the mobile electronic device 65 or represented virtually on the display 84. While the examples provided herein generally relate to smartphone embodiments of the mobile electronic device 65, it should be appreciated that the mobile electronic device 65 may alternatively be embodied as a dedicated remote and variously configured to achieve the same functionality.

With respect to the embodiments described herein, it should be appreciated that the intended backing path 75 inputted to the controller 44 using the mobile electronic device 65 may be provided to the controller 44 as a complete path, in segments, or dynamically. For example, in one embodiment, it is contemplated that a user 85 in possession of the mobile electronic device 65 may input the intended backing path 75 in its entirety prior to it being communicated to the controller 44. In another embodiment, the user 85 may input segments or parts of the intended backing path 75, each segment being communicated to the controller 44 at different time intervals. In yet another embodiment, the intended backing path 75 may be inputted dynamically to the controller 44, such as through the use of a joystick, for example. Thus, given the many ways in which to configure the user-interface of the mobile electronic device 65, it should be appreciated that the manner in which the intended backing path 75 is communicated to the controller 44 may vary.

Upon receiving the intended backing path, the controller 44 autonomously controls the vehicle 14 to back the trailer 12 according to the intended backing path 75. To do so, the controller 44 may issue commands to one or more of the components of the driveline. For example, steering commands may be issued to the power assist steering system 62 while throttle and brake commands may be issued to the powertrain control system 74 and the vehicle brake control system 72, respectively. Additionally, in controlling the driveline, the controller 44 may leverage information provided thereto from a global positioning system 86. By virtue of the controller 44 being able to autonomously control the vehicle 14, the user 85 of the mobile electronic device 65 may dictate the operation of the vehicle 14 from a remote position outside the vehicle 14. Doing so may offer the user 85 more vantage points of the vehicle 14, trailer 12, and operating environment that would otherwise be unavailable if the user 85 was required to be inside the vehicle 14. Nevertheless, should the user 85 desire to dictate the operation of the vehicle 14 from inside the vehicle 14, it is contemplated that the user 85 may either use the mobile electronic device 65 to input the intended backing path or otherwise take control of some or all of the components of the driveline in addition to any other available vehicle equipment.

With continued reference to FIGS. 1 and 2, the system 10 may include a sensing system 88 in communication with the controller 44. The sensing system 88 includes a plurality of sensors 90 disposed on the vehicle 14 and/or trailer 12. While the sensors 90 are generally shown in FIG. 1 disposed about the periphery of the vehicle 14 and the trailer 12, it is to be understood that the sensors 90 may be located elsewhere on the vehicle 14 and/or trailer 12. According to one embodiment, a number of the sensors 90 may be configured as wireless communication transceivers capable of interacting with the mobile electronic device 65 in order to detect its location relative to the vehicle 14 and/or the trailer 12. For example, the wireless communication transceivers may be configured to communicate with the mobile electronic device 65 using Bluetooth® low energy signals, Wi-Fi®, or other communication protocols known in the art. The wireless communication transceivers may each be configured to transmit and receive wireless signals to and from the mobile electronic device 65. The controller 44 may analyze the signal strength and time to return of the signals between the wireless communication transceivers and the mobile electronic device 65 to triangulate the position of the mobile electronic device 65 relative to the vehicle 14 and/or trailer 12. Thus, by virtue of detecting the location of the mobile electronic device 65, the location of the user 85 is ascertained indirectly.

Additionally or alternatively, the location of the user 85 along with other objects in the operating environment may be ascertained directly by the sensing system 88. For example, a number of the sensors 90 of the sensing system 88 may be configured as ultrasonic sensors, radar sensors, LIDAR sensors, infrared, vision-based sensors, or a combination thereof. In some embodiments, a number of the sensors 90 may be configured as vehicle-vehicle sensors thereby enabling communication to occur between the vehicle 14 and other vehicles similarly equipped. The use of vehicle-vehicle sensors enables vehicles to broadcast their position, speed, and other information to other vehicles within a few hundred meters.

Figure 3:
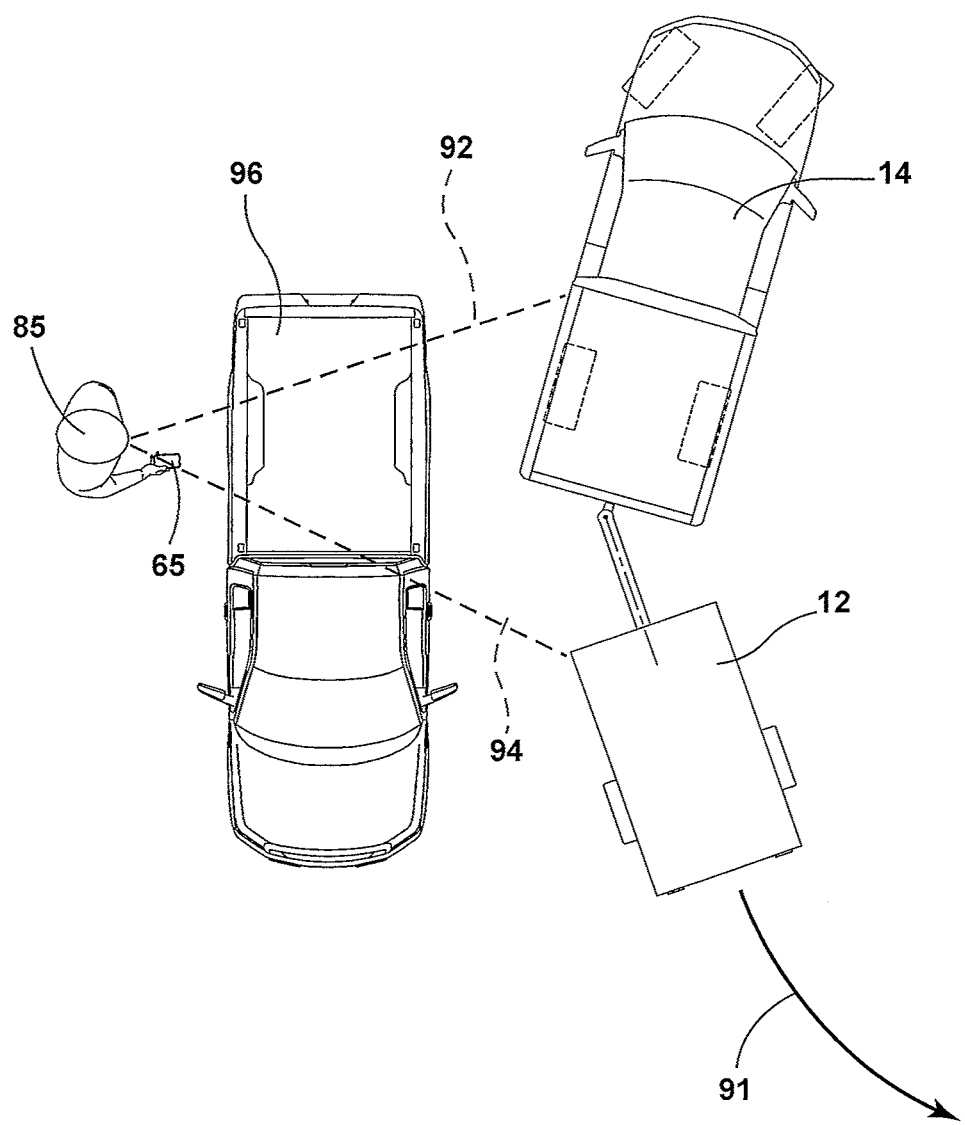
FIG. 3 illustrates one specific scenario where a mobile electronic device is used to remotely input an intended backing path of the trailer.

Referring to the exemplary scenario shown in FIG. 3, the trailer 12 is shown being backed along an intended backing path 91 inputted to the controller 44 using the mobile electronic device 65. In the depicted scenario, the controller 44 may implement a countermeasure if it determines that an impaired line of vision exists between the user 85 and the vehicle 14 and/or trailer 12. According to one embodiment, the countermeasure is implemented if the controller 44 determines that the user 85 has lost sight (e.g., sight lines 92 and 94) of the vehicle 14 and/or the trailer 12. The controller 44 may determine that the user 85 has lost sight based on the sensing system 88 detecting an object (e.g., vehicle 96) between the user 85 and the vehicle 14 and/or trailer 12. For example, the controller 44 may implement the countermeasure if the detected object exceeds a predetermined threshold height, exceeds a height specified by the user, exceeds the height of the mobile electronic device 65, or a combination thereof. Alternatively, the controller 44 may implement the countermeasure regardless of the height of the detected object. Alternatively still, the controller 44 may implement the countermeasure if the sensing system 88 is no longer able to detect the user 85 as such a condition would likely suggest that the user 85 has lost sight of the vehicle 14 and/or the trailer 12. Additionally or alternatively, the imaging device 34 and/or other imaging devices provided on the vehicle 14 and/or the trailer 12 may be leveraged to determine if the user 85 has lost sight. For example, the imaging device 34 and/or other imaging devices may employ any known facial recognition technique in an effort to detect and track the face of the user 85. If the face of the user 85 is no longer detected or turns away from the vehicle 14 and/or the trailer 12, the controller 44 may determine that a lost sight condition is present. Thus, with respect to the embodiments described herein, it is to be understood that the sensing system 88 may also include imaging device 34.

With respect to the depicted scenario shown in FIG. 3, the countermeasure may include slowing or stopping the vehicle 14 and trailer 12 altogether. For example, the controller 44 may send brake commands to the vehicle brake control system 72 to cause the vehicle 14 and trailer 12 to come to a halt. The level of braking may be based on the relative proximity between the detected object and the vehicle 14 and/or trailer 12. For example, it may be desirable to stop the vehicle 14 and trailer 12 sooner when the detected object is in closer proximity to the vehicle 14 and/or the trailer 12 to prevent collision. Additionally or alternatively, the level of braking may be based on the degree of vision impairment of the user 85. For example, if the sensing system 88 is able to detect the user 85 in some capacity and/or the height of the detected object is below a specified threshold, the controller 44 may operate the vehicle 14 at a slower pace. Alternatively, if the sensing system 88 is no longer able to detect the user 85 and/or the height of the detected object meets or exceeds the specified threshold, the controller 44 may operate the vehicle 14 to perform a hard stop.

In some embodiments, the countermeasure may additionally or alternatively include an audio warning, a visual warning, a haptic warning, or a combination thereof. For example, the controller 44 may control the horn 80 to produce a short burst pattern and/or flash the exterior lights 78. Additionally or alternatively, the controller 44 may prompt the mobile electronic device 65 to display a warning message to the user 85. In one embodiment, the warning message may require the user 85 to confirm whether he or she can see the vehicle 14 and/or the trailer 12. In some embodiments, the warning message may instruct the user 85 to move to a better vantage point so that the sensing system 88 can better detect the user 85. Additionally or alternatively, the controller 44 may prompt the mobile electronic device 65 to vibrate.

Figure 4:
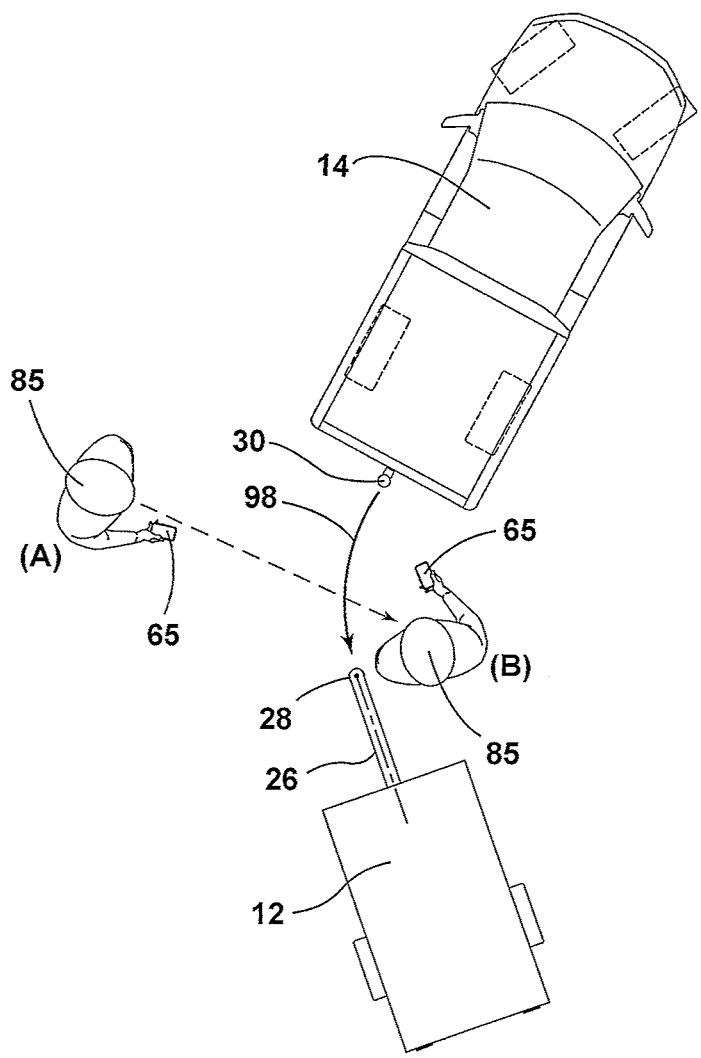
FIG. 4 illustrate on specific scenario where the mobile electronic device is used to remotely input an intended backing path of the vehicle towards the trailer.

Referring to FIG. 4, an exemplary scenario is shown where the user 85 of the mobile electronic device 65 remotely inputs an intended backing path 98 for backing the vehicle 14 toward the trailer 12. In the depicted scenario, the trailer 12 is stationary and its tongue 26 may be elevated relative to the ground such that the hitch ball 30 of the vehicle 14 may be positioned below the coupler assembly 28 of the trailer 12, thereby enabling a hitch connection to be made between the vehicle 14 and the trailer 12.

With respect to the present scenario, the controller 44 may implement a countermeasure if it determines that an impaired line of vision exists between the user 85 and the vehicle 14 and/or trailer 12 according to any of the embodiments described previously with reference to FIG. 3. As an additional precaution, the controller 44 may implement the countermeasure if it determines that the user 85 or other object has crossed into the intended backing path 98 of the vehicle 14. For example, if the user 85 moves from position A to B, the controller 44 may implement the countermeasure based on the sensing system 88 detecting the mobile electronic device 65 and/or the user 85 located between the vehicle 14 and the trailer 12 and within a predetermined distance from the rear of the vehicle 14. Additionally or alternatively the imaging device 34 and/or other imaging devices may be leveraged to detect and monitor the user 85 as he or she crosses the intended backing path 98. In detecting and monitoring the user 85, any known recognition technique may be employed such as facial and/or body recognition. The countermeasure may include any of the examples provided previously with reference to FIG. 3 such as slowing or stopping the vehicle 14, generating a warning, or any other countermeasures that will become apparent to the skilled artisan based on the disclosure provided herein.

Referring back to FIG. 2, the controller 44 is configured with a microprocessor 100 and/or other analog and/or digital circuitry for processing one or more logic routines 102 stored in a memory 104. The routines 102 may be processed using the microprocessor 100 in order to implement the various features described herein, such as, but not limited to, hitch angle detection, image processing, object detection, and autonomous operation of the vehicle 14. Information from equipment onboard the vehicle 14 can be supplied to the controller 44 via a communication network of the vehicle 14, which can include a controller area network (CAN), a local interconnect network (LIN), or other conventional protocols used in the automotive industry. It should be appreciated that the controller 44 may be a stand-alone dedicated controller or may be a shared controller integrated with any of the onboard componentry described herein or other component of the vehicle 14.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

The invention claimed is:

1. A system for backing a trailer with a vehicle, comprising:
   a mobile electronic device remotely located from the vehicle and with which a user inputs an intended backing path for the trailer; and
   a controller for autonomously controlling the vehicle to back the trailer according to the intended backing path, wherein the controller communicates with a sensing system to determine if the user has lost sight of at least one of the vehicle and the trailer.

2. The system of claim 1, wherein the mobile electronic device is one of a smartphone, a tablet, and a dedicated remote.

3. The system of claim 1, wherein the controller is configured to generate a countermeasure if it determines that the user has lost sight of at least one of the vehicle and the trailer.

4. The system of claim 3, wherein the controller determines that the user has lost sight if the sensing system detects an object exceeding a predetermined height and located between the user and at least one of the vehicle and the trailer.

5. The system of claim 3, wherein the sensing system comprises an imaging device, and wherein the controller determines that the user has lost sight if the imaging device is unable to detect the user.

6. The system of claim 3, wherein the countermeasure comprises slowing or stopping the vehicle and trailer.

7. The system of claim 3, wherein the countermeasure comprises generating at least one of an audio warning, a visual warning, and a haptic warning.

8. A system for hitching a vehicle to a trailer, comprising:
   a mobile electronic device remotely located from the vehicle and with which a user inputs an intended backing path of the vehicle towards the trailer; and
   a controller for autonomously controlling the vehicle according to the intended backing path, wherein the controller communicates with a sensing system to determine if the user or other object crosses into the intended backing path, and if so, generates a countermeasure.

9. The system of claim 8, wherein the mobile electronic device is one of a smartphone, a tablet, and a dedicated remote.

10. The system of claim 8, wherein the sensing system comprises at least one of ultrasonic sensors, radar sensors, LIDAR sensors, infrared sensors, and vision-based sensors.

11. The system of claim 8, wherein the controller generates the countermeasure if the sensing system detects at least one of the mobile electronic device and the user located between the vehicle and the trailer are within a predetermined distance from a rear of the vehicle.

12. The system of claim 8, wherein the countermeasure comprises slowing or stopping the vehicle.

13. The system of claim 8, wherein the countermeasure comprises generating at least one of an audio warning, a visual warning, and a haptic warning.

14. A method of backing a trailer with a vehicle, comprising:
   using a mobile electronic device remotely located from the vehicle to input an intended backing path for the trailer; and
   providing a controller for autonomously controlling the vehicle to back the trailer according to the intended backing path, wherein the controller communicates with a sensing system to determine if the user has lost sight of at least one of the vehicle and the trailer.

15. The method of claim 14, wherein the mobile electronic device is one of a smartphone, a tablet, and a dedicated remote.

16. The method of claim 14, wherein the controller is configured to generate a countermeasure if it determines that the user has lost sight of at least one of the vehicle and the trailer.

17. The method of claim 16, wherein the controller determines that the user has lost sight if the sensing system detects an object exceeding a predetermined height and located between the user and at least one of the vehicle and the trailer.

18. The method of claim 16, wherein the controller determines that the user has lost sight if the sensing system is unable to detect the user.

19. The method of claim 16, wherein the countermeasure comprises slowing or stopping the vehicle and trailer.

20. The method of claim 16, wherein the countermeasure comprises generating at least one of an audio warning, a visual warning, and a haptic warning.

* * * * *